United States Patent [19]

Bitterlich et al.

[11] 4,130,992

[45] Dec. 26, 1978

[54] ARRANGEMENT FOR THE STORAGE OF ENERGY IN POWER PLANTS

[75] Inventors: Eberhard Bitterlich, Kettwig; Franz Thelen; Henning Weber, both of Mulheim, all of Fed. Rep. of Germany

[73] Assignee: Deutsche Babcock Aktiengesellschaft, Oberhausen, Fed. Rep. of Germany

[21] Appl. No.: 766,606

[22] Filed: Feb. 7, 1977

[30] Foreign Application Priority Data

May 6, 1976 [DE] Fed. Rep. of Germany ....... 2620023

[51] Int. Cl.² .............................................. F01K 3/12
[52] U.S. Cl. ....................................... 60/652; 60/646; 60/659; 60/678
[58] Field of Search ................. 60/659, 652, 678, 646; 122/35

[56] References Cited

U.S. PATENT DOCUMENTS

| 1,728,375 | 9/1929 | Stender | 60/652 X |
| 3,457,725 | 7/1969 | Schwarzenbach | 60/652 X |

Primary Examiner—Allen M. Ostrager
Attorney, Agent, or Firm—Max Fogiel

[57] ABSTRACT

An arrangement for the storage of energy in power plants in which an excess of water during low-load operation is heated in feed water preheaters, and is stored as hot water in a hot storage vessel. During peak-load operation, the hot water from the storage vessel is fed into a feed water line, bypassing the feed water preheaters. Alternately with the hot water, colder water is taken from or stored in the lower portion of the hot storage tank. Before being fed into the hot storage tank, the colder water is thermally degassed with bleeder steam at a pressure slightly above atmospheric pressure, preferably between 1.01 and 1.5 atmospheres (abs). The feed water tank connected to the degasser is used for volume compensation while storing the hot water in the hot water storage tank. The storage tank may be in the form of three units of substantially identical volume. The hot storage tank and the feed water tank used as warm-water storage, are alternately filled and emptied. The condensate is temporarily stored in a cold storage tank lying behind the condenser. The hot water is stored at a temperature corresponding to the feed water temperature at full-load operation.

12 Claims, 1 Drawing Figure

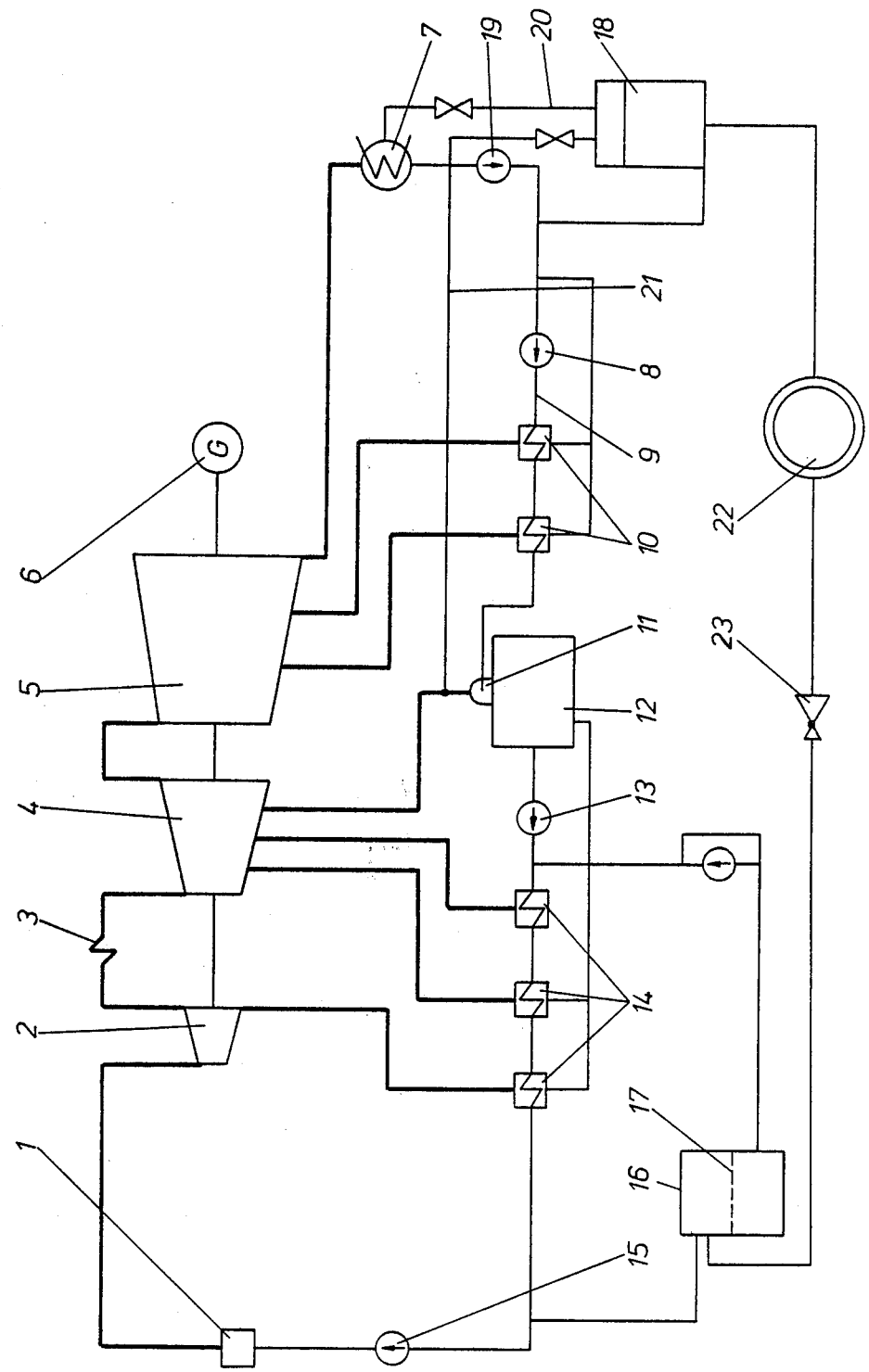

ARRANGEMENT FOR THE STORAGE OF ENERGY IN POWER PLANTS

BACKGROUND OF THE INVENTION

The present invention relates to an arrangement for the storage of energy in power plants where an excess of water during low-load operation is heated in the feed water preheaters, is stored as hot water in a hot storage vessel and is fed during peak-load operation into the feed water line, bypassing the feed water preheater. Alternately with the hot water, colder water is taken from, or stored, in the lower portion of the hot storage vessel.

Such a procedure is used for storing large quantities of hot water in order to handle peak loads for several hours or even several days. The advantage of this procedure is that the construction of a peak-load plant is not necessary if, instead, a few components of the medium-load power plant are strengthened or increased and the hot-water energy system is installed.

With one known procedure, the hot storage vessel is connected in parallel with the feed water preheaters. During low-load operation, hot water is stored in the upper portion of the storage vessel, while the same amount of cold water is taken from the lower portion of the hot-water storage vessel. With this procedure, difficulty is encountered because the colder water is not deaerated at the storage temperature. Hence, the hot water cannot be placed on top of the colder water without special separating elements.

In addition, the procedure described can be improved further.

Accordingly, it is an object of the present invention to provide an arrangement for storing large energy amounts for peak-load coverage for an extended period, which, on the one hand, does not require additional separating elements and which, on the other hand, makes available a large number of steam withdrawals for increasing the output.

Another object of the present invention is to provide an arrangement of the foregoing character which is substantially simple in construction and may be economically maintained in service.

A further object of the present invention is to provide an arrangement, as described, which has a substantially long operating life.

SUMMARY OF THE INVENTION

The objects of the present invention are achieved by providing that before storing in the hot storage vessel, the colder water is thermally de-aerated. The degassing is carried out with bleeder steam at a pressure which is barely above atmospheric pressure, preferably between 1.01 and 1.5 absolute atmospheres. This procedure ensures that only degassed water is supplied to the hot water storage. On the other hand, the thermal degassing takes place at a pressure as low as possible so that all bleeder points with higher pressure can be closed during peak-load operation and this steam can be withdrawn for peak-load coverage in the turbine. Altogether, an increase in output of 12–20% over full-load operation can be achieved.

According to an advantageous improvement of the present invention, the feed water vessel, connected to the degasser, can be used for volume compensation while the hot water is stored in the hot water vessel. In this case, a steam cushion above the hot water in the hot storage vessel can be dispensed with, so that the hot-water storage, which is under high pressure, can be made smaller. Since with the prevailing temperatures, the volume difference between the hot and the colder water is about 30%, the volume of the feed water vessel must be 30% of the hot water storage vessel.

Furthermore, three storage vessels of approximately identical volume can be used. In a cold storage vessel located behind the condenser, the condensate is stored temporarily. This procedure has the advantage that the low-pressure preheaters ahead of the degasser are disconnected during the peak-load period and this steam also can be used to increase the output.

Of these, the hot storage vessel serving as a heat storage is alternately filled with hot feed water or with feed water of the same temperature as in feed water vessel. The feed water vessel is alternately filled and emptied at nearly constant temperature.

Maximum increase in output is achieved if the hot water is stored at a temperature corresponding to the feed water temperature at full load of the boiler. The feed water temperature of a steam turbine process decreases with the partial load since the discharge pressures decrease nearly proportional with the load. To counteract this, it is provided that storing the hot water take place following peak-load operation and at full load or close to full load. Depending on the load program, the storage time is determined in advance; to maintain this condition, the preheaters, the pipe line system and the pumps are adjusted to the load program (schedule).

During the generation of peak current with closed withdrawals the reheater pressure increases so that the steam generator would have to be laid out expressly for the conditions of peak load operation. In order to avoid this, it is proposed that with peak-load operation the temperature and the pressure of the reheated steam are adjusted to each other in such a way that they lie on a line of constant strength of the pipe material. E.G., this can be accomplished by having the temperature of the reheated steam decrease in accordance with the prevailing characteristic curve.

The process in accordance with the present invention may also be operated in conjunction with long-distance heating systems or heat consumers of industry. It is provided that to the storage vessels, a long-distance heating supply is connected. Besides the known improvement of the process efficiency by using the withdrawn steam for supplying heat, these storage systems have the advantage that with simultaneously occurring peak-loads on the electrical supply and the long-distance heat supply, the steam generator and its auxiliary devices need not be dimensioned for the peak load and that during peak-load periods, the stored heat can be used for heating purposes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

A schematic diagram showing the layout of the power plant in accordance with the present invention.

DESCRIPTION OF THE PREFERRED EMBODIMENTS

The steam generator may be a fossile-fuel boiler or a nuclear reactor. The generated steam passes through a high-pressure turbine 2, then via a reheater 3 to a medium-pressure turbine 4 and then to a low-pressure turbine 5. The turbines 2, 4, 5, mounted on one shaft, drive a generator 6.

The turbine exhaust steam is precipitated in condenser 7 and delivered by the condensed-steam pump 8 through the feed water line 9 to the low-pressure feed water preheater 10 which is heated with bleeder steam from the low-pressure turbine 5 or the medium pressure turbine 4. The preheated water is thermally degassed (de-aerated) in the degasser 11 by means of bleeder steam and stored in the feed water storage vessel 12. The pressure of the degassed and preheated water is increased by means of the medium-pressure pump 13. In the series-connected high-pressure preheaters 14, the water is heated to feed water temperature and then delivered by the high-pressure pump 15 to the steam generator.

A hot storage vessel 16 is connected in parallel to the high-pressure preheaters 14. In the upper portion of this hot storage vessel 16, during low-load operation, water which had been heated in the high-pressure preheaters 14 is stored and placed on top of colder water. The separating surface between the hot and the colder water is indicated by line 17. During the peak load period, the steam withdrawals leading to the high pressure preheaters 14 is blocked; the stored hot water, bypassing the high-pressure preheater 14, is withdrawn from the hot water storage vessel 16 and fed into the steam generator 1 by means of high-pressure pump 15 as feed water. The entire steam supplied to the turbine can then be used for utilization in the medium-pressure turbine 4.

Alternately with the hot water, the water which was thermally degassed in the degasser 11 is introduced into or withdrawn from the lower portion of the hot water storage vessel. The use of degassed water makes it possible to simultaneously store hot and cold water ($t >$ 100° C) in one storage vessel. The hot water storage vessel 16 is completely filled with water. Since the hot water occupies a larger volume than the colder water, to compensate for the volume defect, the colder water is placed in the feed water vessel during the storage period. For this purpose, the feed water tank 12 has a volume which is 30% of the volume of hot water storage vessel 16.

The degasser 11 is given a withdrawal pressure which is just above the atmospheric pressure. It should not exceed 1.5 atmospheres (absolute) and be preferably 1.05 atm (abs). All withdrawals at a higher pressure are used for feed water preheating during full load and low-load operation, and for increasing the output during peak-load operation.

In order to also use the low-pressure preheaters 10 to increase output, a storage system comprising three storage vessels is provided. This system comprises the hot water storage 16 (already described), a feed water vessel 12 serving as warm storage vessel and a cold storage vessel 18 which is located behind the condenser 7. All three storage vessels 12, 16, 18 have about the same volume, but different pressures.

The three-storage tank system is operated as follows. During normal operation, the turbine bleeder steam is condensed in condenser 7. The condensate pump 8 increases the pressure of the condensate to the degasser pressure of $>$ 1.0 to 1.5 atm (abs.). In the low-pressure preheaters 10, the condensate is heated and thermally degassed in degasser 11 which is designed as a mixing preheater. The medium pressure pump 13 increases the pressure to the pressure level of the hot water storage 16. In connection with the heating in the high-pressure preheaters 14, the pressure is increased to the feed water pressure of about 260 bar by the high-pressure pump 15.

During peak-load operation, the turbine bleeder steam is also condensed in condenser 7. Since no bleeder steam is available for the low-pressure preheaters 10, the condensate cannot be preheated. The condensate is pumped via pump 19 into the cold storage tank 18 and stored there with the water level rising. The steam cushion above the water level in cold storage vessel 18 is connected via closable lines 20 or 21 either to condenser 7 or to a bleeder line with a pressure of about 1 atm. (abs.). The feed water flow necessary for operating the steam generator 1 is taken from the hot water storage vessel 16. Since the pressure in the hot water storage vessel 16 is to be maintained, the hot water volume withdrawn must be replaced at the same time by an equally large warm water volume. This warm water volume is taken from the warm storage (feed water tank 12) and delivered by means of medium pressure pump 13 to the cold area of the hot storage tank 16. Since the condensate pump 8 does not deliver, the water level in the feed water tank 12 drops. The emptied volume is filled with the steam from the connected bleeder. At the end of the peak load operation, the cold storage tank is filled with water of 1 atm. (abs.) pressure and a temperature corresponding to the condenser temperature. The feed water tank 12 contains steam and only little water. The hot storage tank is filled with water whose median temperature corresponds to that of degasser 11 (105° to 112° C.).

During low-load operation, storage tanks 16 and 12 are charged again. The condensate flow corresponding to low-load is delivered by the pump 19. The water required for filling the warm storage tank (feed water tank 12) is taken from cold storage tank 18, is mixed to the condensate flow ahead of the pump 8, and warmed together with it in the low-pressure preheaters 10. The water level in the feed water tank 12 rises again. The medium pressure pump 13 brings the feed water flow to the pressure level of the hot storage tank 16. The amount delivered by the high-pressure pump 15 is about the same as that of medium-pressure pump 13. The charging flow for the hot storage tank 16 is superposed on this feed water flow through the high-pressure preheaters 14. By increasing the mean temperature in the hot storage tank 16, the mass content decreases. By this amount, the quantity delivered by the medium pressure pump is smaller than that of the high-pressure pump 15. The contents of the feed water tank 12 increases once more.

In the drawing, there is indicated the possibility of using the storage system described for supplying a heat consumer in industry or a long-distance heating system. For this purpose, the heat consuming unit 22 is connected via a pressure reducing valve 23 to the heat storage tank 16. After heat delivery, the water is returned to the cold storage tank or, with only partial heat delivery, is delivered to the steam generator with the temperature no longer a maximum.

It is known that the lower the steam pressure in the pipes, the higher is the allowable steam temperature in the reheater pipes. Inversely, with lower steam temperature, a higher steam pressure can be allowed. For any material used for the reheater pipes, there is a line of constant lifetime utilization which depends on steam temperature and steam pressure. During peak-load operation, with increasing pressure in the pipes of the reheater 3, the temperature of the reheated steam is cooled by injection to a value which corresponds to the line of constant lifetime utilization of the pipe material.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for the storage of energy in power plants comprising the steps of: heating an excess of water during low-load operation in water preheaters; storing the heated water as hot water in a hot storage vessel; feeding the heated water from said storage vessel during peak-load operation into a feed water line and bypassing said feed water preheaters; alternately taking from and storing in a lower portion of said storage vessel cold water and said hot water; degassing thermally said cold water before storing in said storage vessel, said degassing step being applied with bleeder steam at a pressure substantially above atmospheric.

2. A method as defined in claim 1 wherein said pressure is substantially between 1.01 and 1.5 atmospheres absolute.

3. A method as defined in claim 2 wherein during the step of storing hot water in said storage vessel a feed water tank connected to a degasser provides for volume compensation.

4. A method as defined in claim 2 including the step of alternately filling and emptying a hot storage tank and a feed water tank; and storing temporarily condensate in a cold storage tank lying behind a condenser.

5. A method as defined in claim 2 wherein said hot water is stored at a temperature corresponding substantially to the feed water temperature at full load operation.

6. A method as defined in claim 5 wherein said hot water is stored after peak-load operation and at substantially full load.

7. A method as defined in claim 2 wherein temperature and pressure of reheated steam at peak load operation are balanced so that they lie on a line of constant lifetime utilization of pipe material.

8. A method as defined in claim 2 including the step of transferring part of the heat from at least part of the hot water to a heat consumer prior to feeding the hot water into a steam generator.

9. Apparatus for the storage of energy in power plants, comprising: water preheaters for heating an excess of water during low-load operation; a feed water line for receiving the heated water from said storage vessel during peak-load operation and bypassing said feed water preheaters; said storage vessel having a lower storage portion, cold water and hot water being alternately taken from and stored in said lower storage portion of said storage vessel; means for degassing thermally said cold water before storing in said storage vessel by applying bleeder steam at a pressure substantially above atmospheric; said degassing means comprising thermal degasser means having a mixer preheater connected ahead of said hot storage vessel, and a bleeder line connected to said thermal degasser means and having a withdrawal pressure substantially above atmospheric pressure.

10. Apparatus as defined in claim 9 including feed water tank means connected to said degasser means and having a volume of substantially 30% of the volume of said hot storage vessel, said hot storage vessel being substantially completely filled with water.

11. Apparatus as defined in claim 9 including a condenser and low pressure preheaters; a cold storage tank located between said condenser and said low pressure preheaters; a warm storage tank connected to said degasser means; high-pressure preheaters located behind said degasser means; and medium pressure pump means, said hot storage vessel being connected in parallel with said high-pressure preheaters and said medium pressure pump means.

12. Apparatus as defined in claim 9 including heat consumer means; and pressure reduction valve means, said heat consumer means being connected to said hot storage vessel through said pressure reduction valve means.

* * * * *